(12) United States Patent
Hansmann et al.

(10) Patent No.: US 8,918,774 B2
(45) Date of Patent: Dec. 23, 2014

(54) UPDATING A COMPUTER SYSTEM

(75) Inventors: Uwe Hansmann, Tuebingen (DE); Klaus Rindtorff, Weil im Schoenbuch (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/431,722

(22) Filed: Mar. 27, 2012

(65) Prior Publication Data

US 2012/0192172 A1 Jul. 26, 2012

Related U.S. Application Data

(63) Continuation of application No. 12/539,252, filed on Aug. 11, 2009.

(30) Foreign Application Priority Data

Sep. 4, 2008 (EP) .................................. 08163645

(51) Int. Cl.
*G06F 9/44* (2006.01)
*G06F 11/34* (2006.01)
*G06F 11/30* (2006.01)

(52) U.S. Cl.
CPC .............. *G06F 8/68* (2013.01); *G06F 11/3072* (2013.01); *G06F 11/3051* (2013.01); *G06F 11/3409* (2013.01); *G06F 11/3438* (2013.01)
USPC ............................ 717/168; 717/169; 717/170

(58) Field of Classification Search
CPC ... G06F 8/68; G06F 11/3051; G06F 11/3072; G06F 11/3409; G06F 11/3438

USPC ................................................... 717/168, 170
See application file for complete search history.

(56) References Cited

U.S. PATENT DOCUMENTS

| | | | |
|---|---|---|---|
| 5,287,505 A | 2/1994 | Calvert et al. | |
| 6,282,709 B1 * | 8/2001 | Reha et al. | 717/175 |
| 7,340,513 B2 | 3/2008 | Donatelli et al. | |
| 7,475,293 B1 * | 1/2009 | Little et al. | 714/48 |
| 7,478,381 B2 * | 1/2009 | Roberts et al. | 717/168 |
| 7,765,538 B2 * | 7/2010 | Zweifel et al. | 717/168 |
| 7,818,622 B2 | 10/2010 | Burks et al. | |
| 7,870,550 B1 * | 1/2011 | Qureshi et al. | 717/174 |
| 2002/0129347 A1 | 9/2002 | Fischer | |
| 2003/0084434 A1 | 5/2003 | Ren | |
| 2003/0156874 A1 * | 8/2003 | Parry | 400/74 |
| 2003/0163807 A1 * | 8/2003 | Drake et al. | 717/174 |
| 2003/0212983 A1 | 11/2003 | Tinker | |

(Continued)

FOREIGN PATENT DOCUMENTS

WO 2005048075 A2 5/2005

*Primary Examiner* — Eric Oberly
(74) *Attorney, Agent, or Firm* — Holland & Knight LLP; Brian J. Colandreo, Esq.; Jeffrey T. Placker, Esq.

(57) ABSTRACT

A method, computer program product, and system for updating a computer system may include collecting data describing usage characteristics on a customer computer system. Available updates may be stored on a support system together with one or more relevant rules. A recommendation engine may be used to analyze the data describing usage characteristics and to recommend one or more changes based on evaluation of one or more relevant rules for each available update. Changes having one or more attributes and one or more successor relationships to recommend for installation in the computer system may be selected.

13 Claims, 3 Drawing Sheets

(56) References Cited

U.S. PATENT DOCUMENTS

| | | |
|---|---|---|
| 2003/0220992 A1* | 11/2003 | DiRico .................... 709/221 |
| 2004/0181790 A1* | 9/2004 | Herrick .................... 717/168 |
| 2004/0237068 A1 | 11/2004 | Ren |
| 2005/0076325 A1* | 4/2005 | Bergin et al. ............. 717/100 |
| 2006/0041509 A1* | 2/2006 | Koerber ..................... 705/51 |
| 2006/0101450 A1* | 5/2006 | Datta et al. ............... 717/168 |
| 2006/0101457 A1 | 5/2006 | Zweifel et al. |
| 2006/0242286 A1 | 10/2006 | Hawkins et al. |
| 2007/0157192 A1 | 7/2007 | Hoefler et al. |
| 2007/0169079 A1* | 7/2007 | Keller et al. .............. 717/168 |
| 2007/0239700 A1* | 10/2007 | Ramachandran ............ 707/5 |
| 2007/0250829 A1 | 10/2007 | Hillier et al. |
| 2008/0201705 A1* | 8/2008 | Wookey ..................... 717/175 |
| 2008/0295092 A1 | 11/2008 | Tan et al. |
| 2009/0064123 A1* | 3/2009 | Ramesh et al. ............ 717/168 |
| 2009/0100419 A1* | 4/2009 | Childress et al. ......... 717/171 |
| 2009/0119390 A1 | 5/2009 | Donatelli et al. |
| 2009/0157682 A1* | 6/2009 | Gupta ........................ 707/7 |

* cited by examiner

UPDATING A COMPUTER SYSTEM

RELATED APPLICATIONS

The subject application is a continuation application of U.S. Patent Application with Ser. No. 12/539,252, filed 11 Aug. 2009, which claims the benefit of European Patent Application Number 08163645.8 filed on 4 Sep. 2008, the entire content of both applications being herein incorporated by reference.

BACKGROUND OF THE INVENTION

This disclosure relates to updating a computer system, which may include selecting changes having one or more attributes and one or more successor relationships to recommend for installation in the computer system.

Installed software packages may have update mechanisms. Some widespread mechanisms may replace components of the installed software package by newer versions or may install additional features after comparing the version number of a given component or based on customer input that specifies new components to be added.

Further, some complex software solutions may be built on middleware components, and may originate from a multitude of software vendors. Very large installations may reach the performance limits of standard middleware. Customer implementations may be different and may reach the limits of the middleware in a different way.

Moreover, it may be a significant effort to develop, test and tune these systems and their continuous availability is mission critical. The risk of a failure due to the new patch should be avoided as the systems may be used to generate significant business. Therefore, customers may be careful when making updates to their system, like applying a patch. Applying a patch may require to run a new set of regression, load or performance test cases to ensure that the system still performs as good as before.

Furthermore, a data collection and monitoring service may reside at a client system which may collect and send client system information to a backend system. The client system information may be used to update a maintained repository of client system information that may be associated with software installed at the client system. The maintained repository may be used to determine one or more software update recommendations which may be sent to the client system. In response to a trigger event, one or more software updates associated with the update recommendations may be automatically downloaded and deployed at the client system.

Additionally, a patch may be selected to recommend for installation on a given computer system. A patch analyzer program may be selected from a collection of such programs. Such programs may examine the configuration of a particular computer system and the attributes associated with a particular patch and may determine whether an issue relating to the installation of the patch on that system has arisen. Specific analyzers may be designed to detect certain prioritized issues relevant to the specialized needs of particular types of computers systems and to the priorities of those systems' administrators.

Also, customers who depend on an uninterrupted availability of their software applications 24 hours a day and seven days a week may be very careful with applying some patches available for their environment.

BRIEF SUMMARY OF THE INVENTION

In a first implementation, a method of updating a computer system may comprise collecting data describing usage characteristics on a customer computer system. The method may also comprise storing on a support system available updates together with one or more relevant rules. The method may further comprise using a recommendation engine to analyze the data describing usage characteristics and to recommend one or more changes based on evaluation of one or more relevant rules for each available update. Additionally, the method may comprise selecting changes having one or more attributes and one or more successor relationships to recommend for installation in the computer system.

In one or more embodiments a computer program product residing on a computer readable storage medium having a plurality of instructions stored thereon, which, when executed by a processor, may cause the processor to perform operations which may comprise collecting data describing usage characteristics on a customer's computer system. The operations may further comprise storing on a support system available updates together with one or more relevant rules. The operations may additionally comprise using a recommendation engine to analyze the collected usage characteristics data and to recommend one or more changes based on evaluation of one or more relevant rules for each available update.

In another implementation, a data processing program for execution in a data processing system comprising software code portions may perform a method when said program is run on a computer, and the method may comprise collecting data describing usage characteristics on a customer's computer system. The method may further comprise storing on a support system available updates together with one or more relevant rules. The method may additionally comprise using a recommendation engine to analyze the collected usage characteristics data and to recommend one or more changes based on evaluation of one or more relevant rules for each available update.

Figure 1:
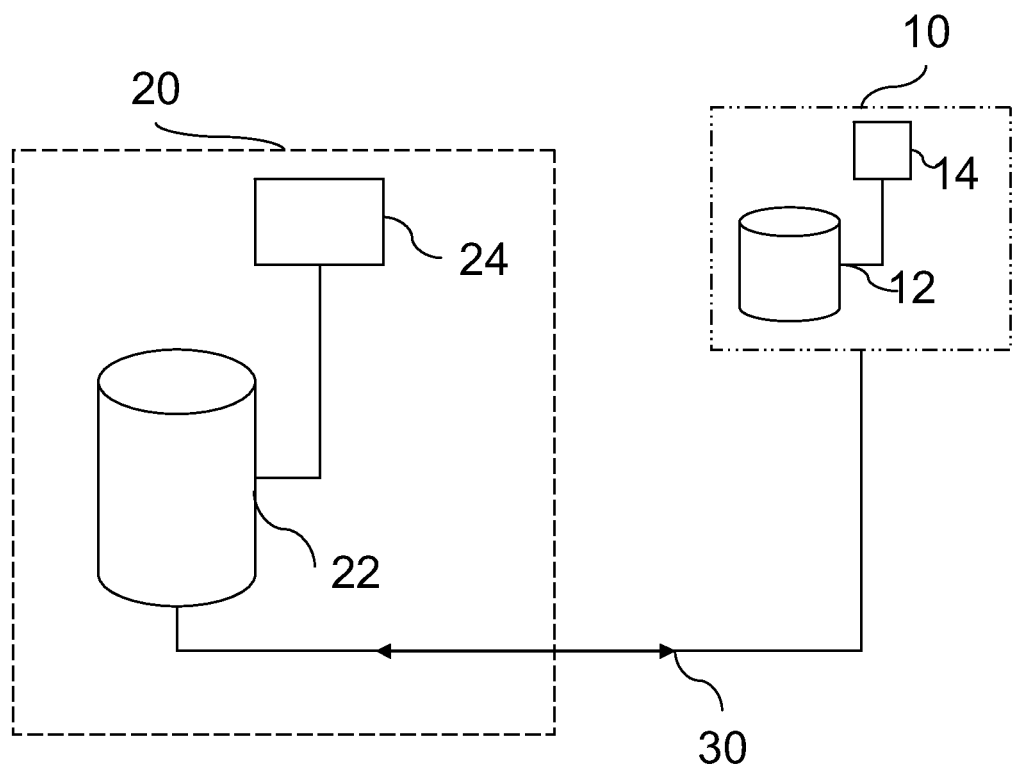
FIG. 1 is an overview of the devices which may be used with a method of the present disclosure.

It should be noted that the drawings are intended to be exemplary embodiments of the disclosure and therefore should not be considered as limiting the scope of the disclosure.

DETAILED DESCRIPTION OF THE INVENTION

This disclosure relates to updating a computer system and may be useful for systems with high availability, reliability and scalability requirements. This disclosure also relates to updating a computer system such that usage characteristics like performance may be optimized.

For the purposes of this disclosure, "software" may be software in any level, i.e. application software, middleware, operating system, BIOS, firmware, FPGA configuration, or any combination of these. Further, "computer system" may be understood as any device or system in which stored information can be changed, such as a server based system of a customer with e.g. thousands of users as well as a consumer device comprising a processor or programmable hardware functions, such as e.g. a field programmable gate array (FPGA). The computer system may also be a cluster system encompassing a multitude of computers, even with software running distributed on the cluster system. A customer computer may be a computer system.

Also, for the purposes of this disclosure, an "update" may be the process of applying a change to this computer system in the form of a patch to fix a software problem, or to improve the level of service for the software, or to change the software to a specific version, or to change the configuration of the software, or to change data used by the software. Moreover, a "change" may be what is being applied to the computer system. The change may be transferred from a recommendation engine to a collection engine. The change may denote any software or data change, e.g. a configuration change by altering one or more parameters of the computer system, changes in any scripts used by the computer system, fixing errors in the software, changes in human readable documentation, e.g. in help documentation, any data change in the target system, e.g. a patch or a fix.

A method for updating a computer system may include selecting changes having one or more attributes and one or more successor relationships to recommend for installation in the computer system, by collecting information describing usage characteristics on a customer computer system; storing on a support system available updates together with one or more relevant rules; and using a recommendation engine to analyze the collected usage characteristics data and to recommend one or more changes based on the evaluation of one or more relevant rules for each available update.

Information describing usage characteristics may be collected on a customer computer system, particularly by a collection engine, sent to a support server, analyzed and subsequently one or more patches and/or configuration changes based on an analysis of the collected data may be recommended by a recommendation engine on the support server. This disclosure also relates to how changes may be identified (recommended) that not only update software components that are known to contain software bugs by newer versions of the components that have this bug fixed, but that also may improve the quality of service delivered by the installed software. The system may analyze if a change is necessary at all, which may minimize the risk of a failure.

For example, even in the absence of a software bug, the installation of a certain change may improve the overall performance, stability, or other characteristic delivered by the installed software. Further, a customer, e.g. an administrator, may only need to apply those changes that are required to make the customer computer work in a desired way, which may improve the chance for success. In addition to updating the software, it may also be possible to recommend changes to test procedures and software documentation to better configure and tune the computer system of the customer.

Further, a collection engine may be coupled to a customer computer system for collecting the data on the customer computer system. The collection engine may be installed on a server of the customer computer system. A preferred usage characteristics collection engine may collect, on the customer computer, not only system configuration information, but also usage characteristics extracted e.g. from error and message log-files to analyze the correctness of the software and profiling information about code executed and time spend in certain code areas of the software.

A recommendation engine may be for analyzing and recommending one or more changes to a customer computer system. The recommendation engine may be preferably coupled, e.g. installed, on a support server of the support system, but may as well be running on the customer computer, or a third independent computer. The recommendation engine may also receive data about the existing changes from the support server and usage data from the collection engine. The recommendation engine may determine relevant changes for the customer computer using the data collected by the usage characteristics collection engine. It may analyze the meta-information characterizing the different available changes, compare it to available error information to identify the relevant code paths or areas requiring some customer actions, and match it with the collected usage characteristics before applying some rules from a predefined rule database ending with some recommendation. Changes may also be applied to the collection engine on the customer computer.

Customers running complex solutions may build on standard middleware, like e.g. an Application Server, and may be reluctant to make changes to the installation, like applying a patch, if there is not an immediate problem that they hope to solve by applying that patch. Software manufacturers may be continuously improving their software by providing patches. Even if the customer may not see an immediate problem today, it may (or may not) show up in future. Today it may be hard for a customer to decide if a patch is relevant for his system or not. Customers may select patches from a manufacturer's website using e.g. the name of the software product and version, the Operating System they are running on and entering some keywords to search within the metadata and the description of the patch.

Referring now to FIG. 1, there is shown customer computer system 10 and support system 20 on which some subject matter of the present disclosure may be employed. Customer system 10 may comprise e.g. customer server 12 on which preferred usage characteristics collection engine 14 may be installed. A multitude of customer computer systems 10 (not shown) may be connected to support system 20.

In one embodiment, support system 20, e.g. owned by a software manufacturer or the like, may comprise support server 22 on which a database with available updates may be stored. Recommendation engine 24 may be coupled to, e.g. installed on, support server 22. Data and recommended changes may be exchanged via data connection 30. In another embodiment, recommendation engine 24 may be coupled to, e.g. installed on, customer system 10. Data and recommended changes may be exchanged via a data connection 30. Software components on customer server 12 may not be simply replaced by the latest version that is available, but changes that update software components may be selected based on information about error information and usage characteristics collected for the installed software.

Figure 2:
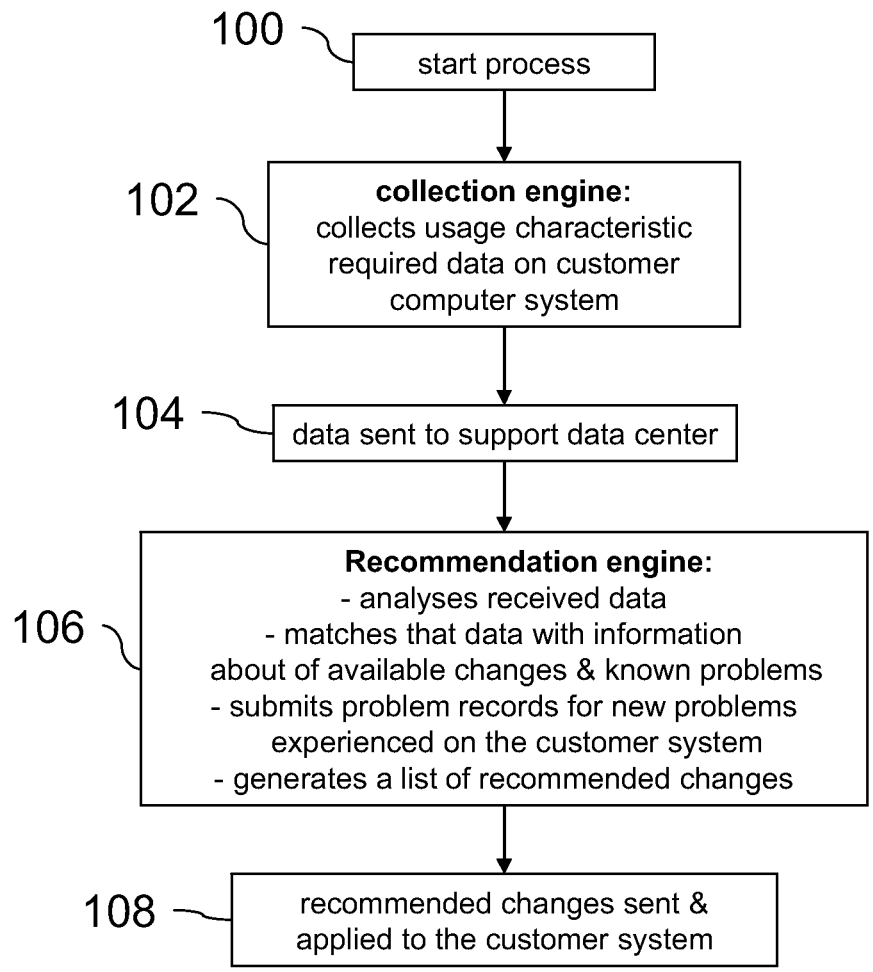
FIG. 2 is a flow-chart of an update process of the present disclosure.

Referring now to FIG. 2 there is shown a flow chart with another embodiment of the present disclosure. In 100 the update process may be started. This may be done on a regular basis, activated by the customer and/or activated by the support center. In 102 the collection engine may collect usage characteristic required data from the customer computer system. The required data may comprise profile information, particularly how much time was spent in which code portions, how often code portions are executed and the like. Besides profile information at least the actual software components installed and the actual version of the software installed may be collected. The collection of the data may be done continuously during operation of customer system 10. In 104 data may be sent to the support data center, i.e. to support system 20, e.g. via internet or the like. In 106 the data received by support system 20 may be transmitted to recommendation engine 24. Recommendation engine 24 may analyze received data, match that data with information about known problems and available patches, submit problem records for new problems experienced on customer system 10 and generate a list of recommended patches. In 108 recommended changes may be sent and applied to the customer system.

Figure 3:
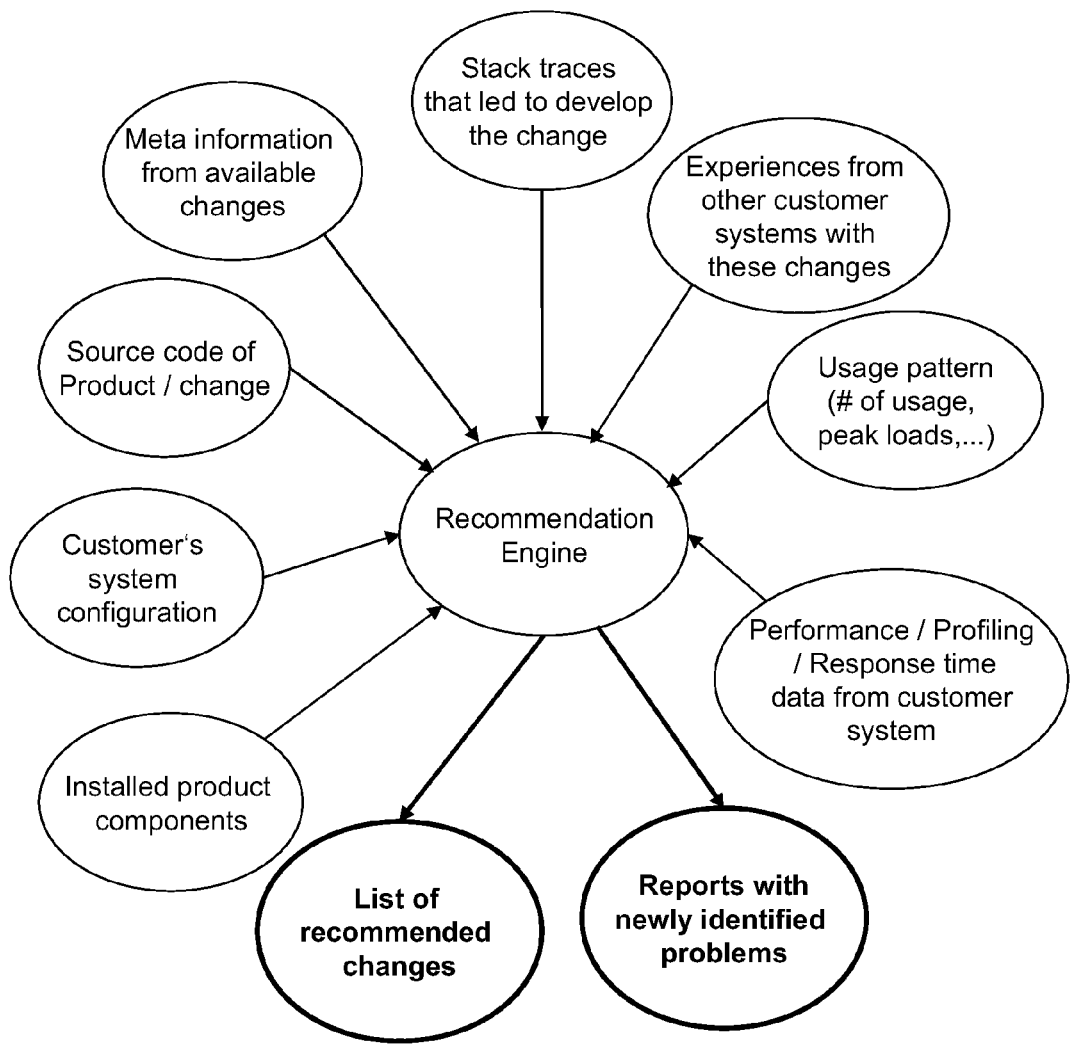
FIG. 3 is a diagram showing examples of information which may be collected and used for patch recommendation according to the present disclosure.

Referring now to FIG. 3, examples of information are shown which may be collected by collection engine 14 (FIG. 1) and transferred to recommendation engine 24 (FIG. 1). For example, if the data shows that certain limitations may be reached by the surveyed customer computer system 10, information, e.g. an email, may be sent to the customer informing about potential future areas of concern or a list of recommended changes may be transmitted back to customer computer system 10 and either displayed for final decision by the administrator or applied automatically. The list of recommended changes may be extracted automatically out of the collected data. The goal of the recommendations may not be only to fix errors but to tune the customer computer system and provide changes for improving the system performance with respect to speed, stability and safety.

In one embodiment two components may be provided. The first component may be usage characteristic collection engine 14 which may be installed on customer server 12. The second component may be recommendation engine 24 installed on support server 22, which may analyze the changes based on the code to be changed, which may have been made available for the particular software product, and recommends changes, e.g. patches and/or tuning/configuration instructions, by comparing the analysis done on the changes with the meta-data information stored about the changes. The recommendation engine may be installed on server 22 of the update provider (support system 20), e.g. a software provider. In case the transmission of the usage characteristics from the customer computer to the support server is considered a security risk, the recommendation engine may also be installed on the customer computer.

The analysis of the change uses data that may be available immediately from the code or added as meta-information, like e.g. the version of the updated software components; and/or meta-information that identifies a change as recommended or mandatory; and/or meta-information that identifies a change that improves performance along with the expected performance; and/or meta-information that identifies a change as applicable for a specific system configuration only; and/or meta-information about other available changes that are required or recommended together with this change.

When using programming languages that leave naming information in the compiled code, information about the code areas on customer server 12 which may be modified by the change may be easily collected automatically from the change. For other languages, meta-information stored with the change may be used.

Usage characteristic collection engine 14 may collect for example (but not limited to) information about the installed software components and their versions; and/or the installed changes from previous updates; and/or the system configuration; and/or the software usage characteristics; and/or quantitative data about the number of important data elements; and/or distribution workload as a function of time; and/or response time history of the software components as a function of time; and/or profiling information; and/or errors observed during run-time.

Depending on the Operating System installed on customer server 12, the installed software components and their versions may be read for example from a registry that contains all the versions, changes and so on that have been applied by e.g. the administrator of customer computer system 10. This may be as simple as reading the registry of the Operating System, or looking into product information files stored on server 12 by the installation of the respective software components.

The system configuration may include other installed middleware components. Usage characteristics collection engine 14 may be familiar with different configuration files of the particular software product. It may analyze that data, extract the relevant details and submit them to recommendation engine 24. The configuration may be determined by a list of version numbers available as meta-information for the software components, or by calculating signatures for them, for example through a hash code. In a software product, like e.g. WebSphere® Portal, the administrator of customer computer system 10 may need to configure computer system 10, usually with the help of configuration files. These configuration files may contain information about other software components used e.g. the database, the LDAP server, the topology of the installation and the like. Usage characteristic collection engine 14 may know the structure of configuration files and how to extract the required information.

Usage characteristics like frequency of usage and amount of data processed by software components may also be collected to allow later analysis. For that, the code of the software component may be instrumented to track and log the important actions. Alternatively this information may be extracted from log-files created by the software components.

Quantitative data about the number of important data elements may be collected as well. By way of example usage characteristics collection engine 14 may query the databases used by the software products to get a better view on the usage. Examples of important data elements are e.g. (but not limited to): number of users registered to the computer system 10, number of users using the computer system 10 per day, average usage of the computer system 10 per user per day, number of page views per user, number of pages (or other relevant elements) in the computer system, amount of large objects stored and processed by the computer system and many more. Recommendation engine 24 may know about the data structure used by software products on customer system 10. In this example, it may, for example, extract data from the information that a software product is storing, for instance the last log in, the number of page views and the like.

Collecting information related to distribution of workload as a function of time may yield, for instance, a measure of how users or other computer systems are interacting with the particular customer computer system (e.g. customer computer system 10), over the course of a day. It may be determined whether there is an average load during the whole day or significant load peaks during specific times of the day. This information may be collected over the course of days to determine e.g. when most users are logging into customer computer system 10.

By collecting response time history of the software components as a function of time, usage characteristics collection engine 14 may measure the response time of critical components of the system, and how this response time may be changing over time for the computer system, and how it may depend on already applied changes. For example, it may be correlated with other important data elements to identify possible reasons for a change in response time. This data may be extracted from live data or historical usage.

Collecting information related to the execution of code over time may yield, for instance, a measure of which software components are frequently used. It may be determined whether there is a potential bottleneck in the software during times of high load. By collecting profiling information about code executed and time spent in certain code areas of the product the collection engine may analyze the involved elements of the system. For instance it may happen that e.g. in a specific configuration certain features of a software product may not be used at all. In that case additional patches for those components may provide no value, but may increase the risk to adversely affect the overall software system.

Collecting information about errors observed during runtime by analyzing available system logs (message logs or error logs like stack dumps) for information about the code areas where problems occurred, (like exceptions, time outs, or network connection problems) may provide the recommendation engine with important hints and actual or upcoming problems in the system. Java™ based systems for example may log exceptions in error situations into a predefined set of log files. Exceptions may contain stack traces that help the recommendation engine with more details on what happened in which place of the code.

After collecting the information the respective logs collected on customer computer system 10, they may be sent as complete files to recommendation engine 24 providing the update service or transferred into alternative formats before sending. In a preferred implementation, data may be organized in an XML data structure for easier communication with recommendation engine 24. When running recommendation engine 24 on support server 22, the data may be transferred automatically or initiated by a system administrator in interactive mode.

Based on this data from customer server 12, recommendation engine 24 may determine relevant patches for customer computer system 10. A database available to recommendation engine 24 may contain the latest available changes and relevant recommendation rules for each.

Recommendation engine 24 may analyze the changes in the code by checking the information about installed code versions, for example determined by the version numbers or hash codes, and/or identifying the modified code areas; and/or may analyze the meta-information of the change (data entered by the support engineer to describe the patch e.g. by providing metadata in XML format or included in packaging); and/or may compare the code path with available stack dump to identify code areas that require changes.

Further, recommendation engine 24 may recommend changes that can fix the behavior of code areas which usage characteristics collection engine 14 may have identified as erroneous. Recommendation engine 24 may also recommend changes which improve the performance of code areas that may have been identified as working with less than the expected performance. Further, changes may be recommended which apply to the current system configuration and are identified as mandatory, and/or additional changes that are identified as prerequisites together with any of the recommended changes.

Moreover, recommendation engine 24 may also analyze the meta-information of the patch (data entered by the support engineer to describe the patch e.g. by providing meta-data in XML format or included in the packaging of the update) and compare the code path with available stack trace to identify the relevant code paths. The relevant code paths may be identified in order to identify code areas that possibly require service. Then these identified code paths and/or code areas may be matched with the data collected from the usage characteristic collection engine to recommend relevant patches, as well as a recommendation which scenarios should be re-tested to ensure stability and performance of the system.

Furthermore, recommendation engine 24 may also validate that the changes will co-exist with the changes already applied to customer system 10 using a code analysis. For that it may analyze the code areas that were modified by each change and for example identify code that was previously modified by another change applied on the customer system, or by identifying code areas that have a dependency on each other, and where changes would be applied in both of them. Based on this information, the recommended change may be marked for attention of a human operator, or removed from the recommendation list.

Additionally, recommendation engine 24 then may apply rules from a rule database for each identified software component. Each of these rules may contain one or many symptom fields and one or many recommendation fields. A symptom field may contain the version number, performance characteristic or error information, whereas in a recommendation field a reference to one or more patches, the minimum version number of the same software component, or a system configuration change recommendation may be contained.

These rules may be applied to determine for one version of a component which minimum version of another installed component may be used. Further, the rules may be applied to determine a component to be updated based on error information generated at computer system 10. The rules may also be applied to determine whether a change for some component fixes a problem in a particular area (e.g. performance of that component, specific exceptions during run-time, supporting a newer version of a third-party component used together with the component.) Additionally, the rules may be applied to determine if the quantitative data available for customer server 12 suggests the installation of a change that may help to improve performance when applied to a system.

All available rules may be applied iteratively and recommendations may be collected until no further rules are applicable and a final configuration of updates is. For example, if a stack trace triggers the rule to update the version of software component A, and another rule requires software component B to be updated as well if component A is updated, both components A and B may be updated.

The resulting list of changes, a so called recommendation list, may then be used to generate a package for updating customer computer system 10, together with meta-information describing the changes. The meta-information may be used to return the information in human readable form to the administrator of customer server 12 in use when in interactive mode. The administrator of computer system 10 may choose to download and/or apply the recommended changes to the computer system 10 in use. The meta-information may also be used when in automatic mode, a package containing the changes together with the meta-information is returned to server 12 in use where it may be stored. Depending on customer's preferences the change may be automatically applied or a notification to the administrator may be generated that informs about the possible problem and availability of a change.

In one embodiment, a method may identify the recommended changes and is discussed in the following example. Each change available at the support server of the support system may include at least one or more rules and preferably a manifest e.g. in XML format that preferably may contain a unique identification (ID) for the change and a version number; and/or environment information that describes the environment that the change is applicable to; and/or error information that describes the observed symptoms in the presence of a software problem; and/or usage information that describes the usage characteristics that the change is applicable to; and/or references to the unique ID of other changes that are prerequisites for this change; and/or optional information about the provider and copyright information; and/or optional description, references to technical documentation and/or licenses that are available, particularly that are available online.

The identification of a change for recommendation may be done by evaluating the rules using e.g. a pattern matching technique. Environmental information and problem error information may be collected for the software installation that has to be maintained. This preferably may comprise the operations of matching the environment information of the software installation against the environment information of a certain change; and/or matching the error information of the software installation against the error information of a certain change; and/or matching the usage characteristics of the software installation against the usage information of a certain change; and/or adding the patch to the recommendation list if one or more of the associated rules fire; and/or adding the prerequisite changes for one or more changes on the recommendation list to the recommendation list.

Matches may be done for textual information by looking for the occurrence of certain string patterns or, if numerical data is used (like e.g. a version number), by relations, e.g. by greater or equal to the particular numerical data. A match then may result in some numeric value, e.g. 1 if found or 0 if not found.

Each change that may be available on support server 22 may be associated with one or more rules. A rule may contain a weight for each of the environmental, error and usage parts, and a threshold value. The match results may be multiplied by their weights and the sum of the products may be calculated. If the sum is larger than the given threshold value the rule may be fired and the associated patch may be selected as a recommendation and added to the result list. Multiple recommendations may result from multiple rules being fired.

For a set of n usage characteristics from customer computer 10 a rule thus may be expressed by a number n of corresponding usage characteristics comparison values, resulting in a number n of match results m, a number n of weights w, a normalization function f, for example the sigmoid function, and a threshold t and may fire if $$f(w1 \cdot m1 + w2 \cdot m2 + \ldots wn \cdot wn) \geq t.$$

Once the recommendation list is built, the prerequisites that are stored in the manifest information of a change may be evaluated and a second list, called dependency list, may be built. Each change stored in the recommendation list may be checked for prerequisite information. If present, the referred patch may be added to the dependency list. Once all changes together with their relevant rules stored on the support server have been examined, the changes from the dependency list may be added to the recommendation list. This procedure may be repeated until the examination of the recommendation list does not result in any additional changes for the dependency list.

As will be appreciated by one skilled in the art, aspects of the present invention may be embodied as a system, apparatus, method or computer program product. Accordingly, and as mentioned above, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a semiconductor or solid state memory, a random access memory (RAM), a read-only memory (ROM), an erasable programmable read-only memory (EPROM or Flash memory), an optical fiber, a portable compact disc read-only memory (CD-ROM), an optical storage device, magnetic tape, a magnetic storage device, a removable computer diskette, a rigid magnetic disk, an optical disk, compact disk-read-only memory (CD-ROM), compact disk-read/write (CD-R/W), DVD or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

A computer program product and/or computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Data processing system 20, e.g. representing support server 22, suitable for storing and/or executing program code may include at least one processor coupled directly or indirectly to memory elements through a system bus. The memory elements may include local memory employed during actual execution of the program code, bulk storage, and cache memories which provide temporary storage of at least some program code in order to reduce the number of times code must be retrieved from bulk storage during execution.

Input/output or I/O-devices (including, but not limited to keyboards, displays, pointing devices, etc.) may be coupled to the system either directly of through intervening I/O controllers. Network adapters may also be coupled to the system to enable the data processing system or remote printers or storage devices through intervening private or public networks. Modems, cable modem and Ethernet cards are just a few of the currently available types of network adapters.

Aspects of the present invention may be described below with reference to flowchart illustrations and/or block diagrams of methods, apparatus (systems) and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures may illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A number of embodiments and implementations have been described. Nevertheless, it will be understood that various modifications may be made. Accordingly, other embodiments and implementations are within the scope of the following claims.

What is claimed is:

1. A method of updating a computer system, comprising:
storing on a support system available updates configured to apply a change to the computer system and one or more relevant rules corresponding to each change, wherein each of the one or more relevant rules contains a weight for each of environment information, error information, and usage characteristics and a specified threshold value;
collecting data describing the usage characteristics on the computer system, wherein the usage characteristics include at least one of time spent in a code area of the computer system and amount of data processed;
using a recommendation engine to analyze the data describing the usage characteristics and to recommend one or more changes based on evaluation of the one or more relevant rules and the analyzed collected usage characteristics data, including, at least in part, the time spent in a code area of the computer system used for comparing value added versus risk of adverse effect;
evaluating the one or more rules for the one or more recommended changes to be used by a pattern matching technique, the pattern matching technique including at least one of: matching environment information of the computer system against environment information of the one or more changes, matching error information of the computer system against error information of the one or more changes, and matching usage characteristics of the computer system against usage characteristics of the one or more changes, wherein a match results in a numeric value, and for each match, multiplying the match by its associated weight to produce products and calculating a sum of the products such that if the sum of the products exceed the specified threshold value the corresponding change is added to a recommendation list corresponding to the computer system; and
adding prerequisite changes corresponding to the one or more changes on the recommendation list to the recommendation list.

2. The method of claim 1, further comprising:
providing a collection engine coupled to the computer system for collecting the data on the computer system.

3. The method of claim 1, further comprising:
providing a rule database containing available changes and rules for selecting the available changes.

4. The method of claim 3, further comprising:
generating a collection of recommended changes by applying the rules iteratively until a stable collection of zero or more recommended changes is determined that does not require to apply further rules from the rule database.

5. The method of claim 3 wherein the rules in the rule database further comprises:
a symptom field, including at least one of:
a version number;
a performance characteristic; and
the error information; and
a recommendation field, including at least one of:
a reference to one or more changes;
a minimum version number of a same software component; and
a configuration change.

6. The method of claim 1, further comprising:
analyzing information characterizing one or more different available changes;
comparing the one or more changes to available stack traces of the computer system to identify at least one of relevant code paths and areas requiring an action of a user; and
matching the one or more changes with the collected data describing usage characteristics before applying one or more rules from a predefined rule database for identified software components.

7. The method of claim 1, further comprising:
determining a minimum version of an installed software component that must be used if one version of a particular software component is used;

determining a software component to be updated based on error information that will be generated at the computer system in use if a known problem occurs in a form of one or more stack traces;

determining whether one version of a change fixes a problem in a particular code area of the installed software component; and determining if quantitative data available for the computer system suggests installation of an update that can help to improve performance when applied to a system with a given scale of the system.

8. The method of claim 1 wherein at least one usage characteristic comprises at least one of:

a usage characteristic related to a frequency of usage;

a distribution of workload as a function of time;

a response time of an installed software component as a function of time;

a code executed and time spent in one or more particular code areas of software components;

installed software components;

installed version of one or more software components; and errors observed during runtime.

9. The method of claim 1, further comprising at least one of:

starting an update procedure; and applying a list of recommended updates automatically.

10. The method of claim 1, further comprising at least one of:

starting an update procedure; and applying a list of recommended updates interactively.

11. The method of claim 1, further comprising at least one of:

recommending tuning tests; and documentation to better configure and/or test the computer system based on the one or more recommended changes.

12. A computer program product residing on a non-transitory computer readable storage medium having a plurality of instructions stored thereon, which, when executed by a processor, cause the processor to perform operations comprising:

storing on a support system available updates configured to apply a change to a computer system and one or more relevant rules corresponding to each change, wherein each of the one or more relevant rules contains a weight for each of environment information, error information, and usage characteristics and a specified threshold value;

collecting data describing the usage characteristics on the computer system, wherein the usage characteristics include at least one of time spent in a code area of the computer system and amount of data processed;

using a recommendation engine to analyze the data describing the usage characteristics and to recommend one or more changes based on evaluation of the one or more relevant rules and the analyzed collected usage characteristics data, including, at least in part, the time spent in a code area of the computer system used for comparing value added versus risk of adverse effect;

evaluating the one or more rules for the one or more recommended changes to be used by a pattern matching technique, the pattern matching technique including at least one of: matching environment information of the computer system against environment information of the one or more changes, matching error information of the computer system against error information of the one or more changes, and matching usage characteristics of the computer system against usage characteristics of the one or more changes, wherein a match results in a numeric value, and for each match, multiplying the match by its associated weight to produce products and calculating a sum of the products such that if the sum of the products exceed the specified threshold value the corresponding change is added to a recommendation list corresponding to the computer system; and adding prerequisite changes corresponding to the one or more changes on the recommendation list to the recommendation list.

13. A computing system including a processor and memory configured to perform operations comprising:

storing on a support system available updates configured to apply a change to a computer system and one or more relevant rules corresponding to each change, wherein each of the one or more relevant rules contains a weight for each of environment information, error information, and usage characteristics and a specified threshold value;

collecting data describing the usage characteristics on the computer system, wherein the usage characteristics include at least one of time spent in a code area of the computer system and amount of data processed;

using a recommendation engine to analyze the data describing the usage characteristics and to recommend one or more changes based on evaluation of the one or more relevant rules and the analyzed collected usage characteristics data, including, at least in part, the time spent in a code area of the computer system used for comparing value added versus risk of adverse effect;

evaluating the one or more rules for the one or more recommended changes to be used by a pattern matching technique, the pattern matching technique including at least one of: matching environment information of the computer system against environment information of the one or more changes, matching error information of the computer system against error information of the one or more changes, and matching usage characteristics of the computer system against usage characteristics of the one or more changes, wherein a match results in a numeric value, and for each match, multiplying the match by its associated weight to produce products and calculating a sum of the products such that if the sum of the products exceed the specified threshold value the corresponding change is added to a recommendation list corresponding to the computer system; and adding prerequisite changes corresponding to the one or more changes on the recommendation list to the recommendation list.

* * * * *